UNITED STATES PATENT OFFICE.

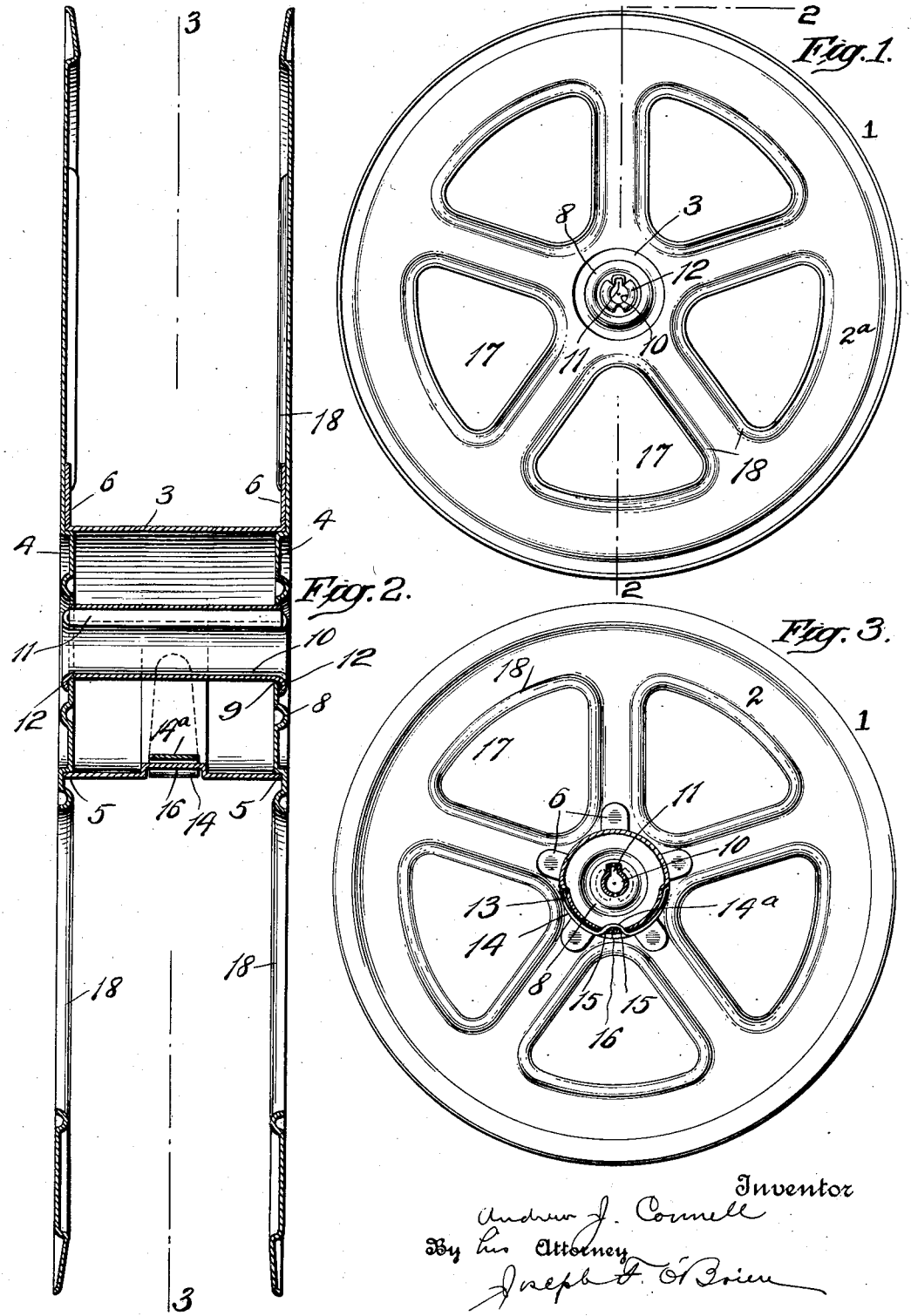
A. J. CONNELL.
FILM REEL.
APPLICATION FILED OCT. 30, 1919.
1,391,372.	Patented Sept. 20, 1921.
Inventor
Andrew J. Connell
By his Attorney
Joseph F. O'Brien

ANDREW J. CONNELL, OF COLLEGE POINT, NEW YORK, ASSIGNOR, BY MESNE ASSIGNMENTS, TO THE CENTRAL METAL PRODUCTS CORPORATION, A CORPORATION OF DELAWARE.

FILM-REEL.

1,391,372.  Specification of Letters Patent.  Patented Sept. 20, 1921.

Application filed October 30, 1919. Serial No. 334,429.

*To all whom it may concern:*

Be it known that I, ANDREW J. CONNELL, a citizen of the United States, and a resident of College Point, in the county of Queens and State of New York, have invented certain new and useful Improvements in Film-Reels, of which the following is a specification.

This invention relates to improvements in film reels.

The objects of my invention are to produce a sheet-metal film reel which may be manufactured economically, which will be composed of the fewest number of parts, which may be readily and quickly assembled and fastened together, preferably by spot welding, and which when so assembled and fastened will produce a reel which will as a whole be rigid and strong and the wing parts of which will likewise be relatively strong and rigid.

With these and other objects in view, the invention comprises the combination of members and arrangement of parts so combined as to co-act and coöperate with each other in the performance of the functions and the accomplishment of the results herein contemplated, and comprises in one of its adaptations the species or preferred form illustrated in the accompanying drawings, in which:

Figure 1 is a plan view of a reel embodying my invention;

Fig. 2 is a section on the line 2—2 of Fig. 1; and

Fig. 3 is a section on the line 3—3 of Fig. 2.

Referring now to these drawings which illustrate a preferred embodiment of my invention, 1 indicates a reel composed entirely of sheet-metal and embodying wings 2—2ª respectively positioned on opposite sides of a cylindrical film-hub 3. Each of the wings 2—2ª has, as shown, a hub portion provided with a circular inwardly extending ridge 4, the outer wall of which is adapted to abut against and engage the side edges 5 of the cylindrical film-hub 3, and this hub is provided with a series of radially extending lugs or flanges 6 which abut against the inner flat portions of the spokes 7 of the said wing so as to permit the spot welding of the said flanges to the spoke portion 7 of said wing. The hub portion of each of the wings is also preferably further reinforced by means of outwardly extending circular rib 8 and both of said wings are provided with circular central or axial apertures 9 formed concentrically with the ridges 4, through which extends a cylindrical machine hub 10 which, as shown, is provided with a stamped up keying groove 11 and has flanges 12 fitted over the edges of the circular aperture 9 in the said wings 2—2ª. It will be seen that the film-hub 3 which, as aforesaid, engages the inwardly extending walls of the ridges 4, spaces the wings from each other and by reason of the spot welding of the flanges 6 of said hub to the spokes 7 of the wings holds the parts together from the inside, while the bent over flanges 12 of the concentric machine hub 10 which abut against the outer surface of the hub also assists in retaining the wings together by pressing against the opposite or outer surfaces of the two oppositely disposed wings.

The cylindrical reel hub 3 is provided in a portion of its periphery with a depressed clip groove 13 in which is seated a spring clip 14 for engagement with the film. As shown, the groove portion 13 of the hub is provided with parallel slots 15 and the spring clip 14 is provided with a bend 14ª and extends through the slots 15 and has the bend 14ª abutting against and engaging the tongue portion 16 between the said parallel slots 15.

In order to lighten the construction and at the same time reinforce the same I preferably provide a wing with a series of substantially triangular apertures 17, the edges of which are embossed to provide inwardly disposed ribs or beads 18 so as to reinforce and make rigid said wings. The outer perimeters of each of the wings are also provided with oppositely disposed depressed grooves and the perimeter of each wing terminates in a wall of this groove so as to produce a substantially flat edge.

Having described my invention I claim:

1. A sheet-metal film reel embodying opposing sheet-metal wings having spokes provided with embossed reinforcing portions and flat portions intermediate such embossed portions, and a sheet-metal film-hub having flanges at opposite ends bent at substantially a right angle to the axis of the hub and abutting against the flat portions of said spokes and welded thereto.

2. A sheet-metal film-reel embodying opposing sheet-metal wings, each having a series of corresponding triangular cut-out portions to form spokes and a sheet-metal film-hub having a series of radial flanges at each side thereof abutting against the inner surfaces of said spokes and welded thereto.

3. A sheet-metal film-reel embodying opposing sheet-metal wings, each having a series of corresponding triangular cut-out portions embossed along the edges to form spokes, having flat central portions and beaded edges and a sheet metal film-hub having a series of radial flanges at each side thereof abutting against the inner surfaces of the flat portions of said spokes and welded thereto.

4. A sheet-metal film-reel embodying opposing sheet-metal wings, each having a series of corresponding triangular cut-out portions to form spokes and a hub portion provided with an inwardly extending ridge and a sheet-metal film-hub fitting over said ridge and having a series of radial flanges at each side thereof abutting against the inner surfaces of said spokes and welded thereto.

5. A sheet-metal film-reel embodying opposing sheet-metal wings, each having a series of corresponding triangular cut-out portions to form spokes and a hub portion provided with an inwardly extending ridge and corresponding axial apertures to form a central bore, a sheet-metal film-hub fitting over said ridge and having a series of radial flanges at each side thereof abutting against the inner surfaces of said spokes and welded thereto and a sheet-metal machine-hub fitted in said axial aperture and having flanges abutting against the outer edges thereof.

In witness whereof I have signed my name to the foregoing specification in the presence of two subscribing witnesses.

ANDREW J. CONNELL.

Witnesses:
M. PLUNKETT,
JOSEPH F. O'BRIEN.